Patented Apr. 1, 1924.

1,488,656

UNITED STATES PATENT OFFICE.

GEORGE HUGH WALLACE, OF PORT JEFFERSON, NEW YORK.

CHEMICAL HEATER.

No Drawing.   Application filed February 17, 1923.   Serial No. 619,759.

*To all whom it may concern:*

Be it known that I, GEORGE HUGH WALLACE, a citizen of the United States, and resident of Port Jefferson, in the county of Suffolk and State of New York, have invented certain new and useful Improvements in Chemical Heaters, of which the following is a specification.

My invention relates to chemical heaters and particularly to that type of chemical heater in which the chemical action evolving the heat is carried on over an extended period of time and in which a desirable amount of heat is given off for a number of hours.

The mixture of chemicals which I have discovered to have favorable properties consists of a finely divided metal, an oxidizing compound or depolarizer, and an electrolyte which in solution is ionized.

As the electrolyte I can use sodium chloride, potassium chloride, or some other ironizable substance. The metal can be an element such as iron, zinc, copper, or some other metal. For the depolarizer I can use lead dioxide, manganese dioxide, or some other oxidizing reagent.

As above noted I find that iron, zinc, copper or other metal can be used for this purpose but I find that iron is an economical metal to use and use it in the comminuted form with excellent results. As may appear from the foregoing paragraphs iron with small quantities of other metal therewith such as occurs in chips from metal working is suitable for this purpose. With the metal I use an electrolyte which in a suitable ionizing solvent reacts with said metal with an evolution of heat, and in conjunction with these I use a depolarizer, in specific instance a deoxidizing reagent, to clear the metal during the reaction of any reaction retarding or preventing element, molecules, or ions which may accumulate on the surface thereof.

One embodiment of my discovery consists of a mixture of finely divided iron, sodium chloride, and manganese dioxide. This mixture is placed in a suitable heater receptacle and when it is desired to use the heater a small amount of water is added. On the addition of the water an electrochemical action takes place during which heat is evolved. This action will continue for some hours when only a few ounces of the mixture is used and will give off considerable heat bringing the mixture and receptacle up to a temperature of about 90 degrees centigrade.

A mixture which I have found to work satisfactorily contains 84 per cent of iron, 10 per cent of manganese dioxide, and 6 per cent of sodium chloride. But my discovery is not limited to these proportions as I have found that other proportions generate an appreciable amount of heat.

The receptacle for holding the mixture may be of any form, depending upon the application for which the heat is desired. Flexible pads of rubber or other suitable material may be used to hold the heating mixture, for purposes of domestic or hospital use. Blankets for automobile radiators or small pads for carburetors may be made with pockets to hold a charge of the heating mixture.

Having described my discovery and its application I claim:

1. A mixture for producing heat by chemical action with water comprising a metal, an oxidizing agent, and an electrolytic salt of the alkali group.

2. A mixture for producing heat by chemical action with water comprising metal, a depolarizing agent, and a halogen salt of the alkali group.

3. A mixture for producing heat by chemical action with water comprising metal, a depolarizing agent, and a halogen salt of an alkali metal.

4. A mixture for producing heat by chemical action with water comprising metal, a depolarizing agent, and a salt of an alkali metal.

5. A mixture for producing heat by chemical action with water comprising metal, a depolarizing agent, and a salt of chlorine and a radical of the alkali group.

6. A mixture for producing heat by chemical action with water comprising metal, a depolarizer, and sodium chloride.

7. A mixture for producing heat by chemical action with water comprising finely divided metal, manganese dioxide, and sodium chloride.

8. A mixture for producing heat by chemical action with water comprising finely divided iron, manganese dioxide, and sodium chloride.

9. A mixture for producing heat by chemical action with water comprising manganese dioxide, sodium chloride, and metal which is principally iron.

10. A mixture for producing heat by chemical action comprising manganese dioxide, a solution of sodium chloride, and metal which is principally iron.

11. A mixture for producing heat by chemical action comprising 10 per cent manganese dioxide, 6 per cent sodium chloride, and 84 per cent metal which is principally iron.

12. A mixture for producing heat by chemical action comprising 10 parts manganese dioxide, 6 parts sodium chloride, and 84 parts metal which is principally iron, and water.

13. A mixture for producing heat by chemical action comprising a metal, an oxidizing agent, and a solution of an electrolyte.

14. A mixture for producing heat by chemical action comprising 84 per cent iron, 10 per cent manganese dioxide, and 6 per cent sodium chloride.

15. A mixture for producing heat by chemical action with water comprising metal, a depolarizing agent, anl an electrolyte.

16. A mixture for producing heat by chemical action with water comprising metal which is principally iron, a depolarizing agent, and an electrolyte.

17. A mixture for producing heat by chemical action with water comprising metal which is principally iron, a depolarizer which is principally manganese dioxide, and an electrolyte.

Signed at New York, in the county of New York and State of New York, this 14th day of February, A. D. 1923.

GEORGE HUGH WALLACE.